United States Patent
Houdayer et al.

(10) Patent No.: US 8,960,695 B2
(45) Date of Patent: Feb. 24, 2015

(54) SUSPENSION THRUST BEARING DEVICE AND MCPHERSON STRUT EQUIPPED WITH SUCH A DEVICE

(71) Applicants: Christophe Houdayer, Semblancay (FR); Jean-Luc Jadeau, Semblancay (FR); Herve Maury, La Membrolle sur Choisille (FR); Bruno Montboeuf, Cerelles (FR); Jean-Marc Soudee, Tours (FR); Desire Vidot, Ballan-Miré (FR)

(72) Inventors: Christophe Houdayer, Semblancay (FR); Jean-Luc Jadeau, Semblancay (FR); Herve Maury, La Membrolle sur Choisille (FR); Bruno Montboeuf, Cerelles (FR); Jean-Marc Soudee, Tours (FR); Desire Vidot, Ballan-Miré (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/761,225

(22) Filed: Feb. 7, 2013

(65) Prior Publication Data
US 2013/0207365 A1 Aug. 15, 2013

(30) Foreign Application Priority Data
Feb. 9, 2012 (FR) ...................................... 12 51229

(51) Int. Cl.
*B60G 15/00* (2006.01)
*B60G 13/00* (2006.01)
*B60G 15/06* (2006.01)
*F16C 19/12* (2006.01)
*F16C 35/063* (2006.01)
(Continued)

(52) U.S. Cl.
CPC ............ *B60G 13/003* (2013.01); *B60G 15/068* (2013.01); *F16C 19/12* (2013.01); *B60G 15/067* (2013.01); *F16C 35/063* (2013.01); *F16C 35/073* (2013.01); *F16C 33/586* (2013.01); *F16C 33/588* (2013.01); *B60G 2204/418* (2013.01); *F16C 2361/53* (2013.01)
USPC ............................ 280/124.147; 280/124.155

(58) Field of Classification Search
CPC ........ B60G 15/068; B60G 15/067; F16F 9/54
USPC .................... 280/124.155, 124.147
See application file for complete search history.

(56) References Cited

U.S. PATENT DOCUMENTS

| | | | | | |
|---|---|---|---|---|---|
| 4,274,655 | A | * | 6/1981 | Lederman | ............... 280/124.155 |
| 4,552,467 | A | * | 11/1985 | Takei et al. | .................... 384/615 |
| 4,566,812 | A | * | 1/1986 | Takei et al. | .................... 384/484 |

(Continued)

FOREIGN PATENT DOCUMENTS

| | | |
|---|---|---|
| DE | 3713699 A1 | 11/1987 |
| EP | 0342725 A1 | 11/1989 |

(Continued)

*Primary Examiner* — Nicole Verley
(74) *Attorney, Agent, or Firm* — Mark Ussai; SKF USA Inc. Patent Dept

(57) ABSTRACT

The present invention concerns a suspension thrust bearing device adapted to receive a shock absorber piston rod along a main axis (X1), the device including a single bearing forming an axial thrust bearing and including an inner race, an outer race and rolling members disposed between the inner race and the outer race, and at least one intermediate member adapted to transmit to the inner race essentially axial forces exerted on the device by a suspension spring. One of the inner race and the intermediate member extend(s) radially beyond the outer race in the direction of the main axis (X1), forming a bearing surface for fixing and centering the shock absorber piston rod relative to the device. The invention also concerns a motor vehicle McPherson strut including a shock absorber and a suspension thrust bearing device as referred to above.

15 Claims, 2 Drawing Sheets

(51) Int. Cl.
*F16C 35/073* (2006.01)
*F16C 33/58* (2006.01)

(56) References Cited

U.S. PATENT DOCUMENTS

| | | | | |
|---|---|---|---|---|
| 4,690,425 | A * | 9/1987 | Kubo | 280/124.155 |
| 4,699,530 | A * | 10/1987 | Satoh et al. | 384/609 |
| 5,232,209 | A * | 8/1993 | de Fontenay | 267/220 |
| 5,263,694 | A * | 11/1993 | Smith et al. | 267/220 |
| 6,267,512 | B1 * | 7/2001 | Beghini et al. | 384/609 |
| 6,786,646 | B2 * | 9/2004 | Handke | 384/617 |
| 7,032,912 | B2 * | 4/2006 | Nicot et al. | 280/124.147 |
| 7,192,041 | B2 * | 3/2007 | Nicot et al. | 280/124.147 |
| 7,364,177 | B2 * | 4/2008 | Handke et al. | 280/124.147 |
| 7,681,896 | B2 * | 3/2010 | Yano | 280/124.155 |
| 7,811,005 | B2 * | 10/2010 | Beghini et al. | 384/609 |
| 8,226,301 | B2 * | 7/2012 | Poulle et al. | 384/609 |
| 8,297,633 | B2 * | 10/2012 | Siebeneick | 280/124.147 |
| 8,308,176 | B2 * | 11/2012 | Lenon et al. | 280/124.147 |
| 8,348,029 | B2 * | 1/2013 | Winocur | 188/322.12 |
| 8,474,846 | B2 * | 7/2013 | Dubus et al. | 280/124.155 |
| 2004/0100057 | A1 * | 5/2004 | Nicot et al. | 280/93.5 |
| 2005/0008276 | A1 * | 1/2005 | Beghini et al. | 384/609 |
| 2005/0247531 | A1 * | 11/2005 | Oota | 188/322.19 |
| 2007/0144850 | A1 * | 6/2007 | Hattori | 188/322.16 |
| 2008/0048370 | A1 * | 2/2008 | Corlet et al. | 267/220 |
| 2009/0315292 | A1 | 12/2009 | Winocur | |
| 2011/0049829 | A1 * | 3/2011 | Migliore et al. | 280/124.146 |
| 2011/0187071 | A1 * | 8/2011 | Corbett et al. | 280/124.155 |

FOREIGN PATENT DOCUMENTS

| | | |
|---|---|---|
| EP | 1609632 A2 | 12/2005 |
| EP | 1744078 A2 | 1/2007 |
| FR | 2783203 A1 | 3/2000 |
| FR | 2918138 A1 | 1/2009 |
| WO | WO2011045488 A1 | 4/2011 |

* cited by examiner

SUSPENSION THRUST BEARING DEVICE AND MCPHERSON STRUT EQUIPPED WITH SUCH A DEVICE

CROSS-REFERENCE TO RELATED APPLICATION

This US Non-Provisional Utility application claims the benefit of copending French Patent Application Serial No. FR1251229 filed on Feb. 9, 2012, which is incorporated herein in its entirety.

FIELD OF THE INVENTION

The present invention concerns a suspension thrust bearing device. The invention also concerns a motor vehicle McPherson strut comprising a shock absorber and such a suspension thrust bearing device. The field of the invention is that of suspension systems, notably motor vehicle suspension systems.

BACKGROUND OF THE INVENTION

In known manner, a motor vehicle suspension system includes a McPherson strut supporting a vehicle axle and wheel. A suspension thrust bearing is disposed in the upper part of the McPherson strut, at the end opposite the wheel and the ground, between a suspension spring and an upper member rigidly fastened to the body of the vehicle. The spring is disposed around a shock absorber piston rod, the end of which may be rigidly fastened to the body of the vehicle. The suspension thrust bearing includes at least one bearing, with an upper race rigidly fastened to the upper member and a lower race on which the spring comes to bear axially, either directly or indirectly.

Accordingly, the suspension thrust bearing enables axial forces to be transmitted between the suspension spring and the body of the vehicle, whilst allowing relative angular movement between the races of the bearing. This relative angular movement be the result of compression of the suspension spring and/or of turning of the steerable wheels. Known devices enable rotation of the complete suspension and the steerable wheel when a driver of the vehicle turns the steering wheel. On the other hand, as the shock absorber piston rod is fixed relative to the body of the vehicle, a resisting torque is generated between the rod and the shock absorber body.

To reduce the resisting torque it is known to add a second bearing to the suspension thrust bearing, between the shock absorber piston rod and the upper member fixed to the body. This increases its cost and its overall size, however.

US-A-2007 144 850 describes such a suspension thrust bearing with two bearings.

Alternatively, there is known a suspension thrust bearing comprising a single bearing combining the two functions, on the one hand rotation of the suspension and on the other hand reduction of the resisting torque of the shock absorber piston rod. In addition to these two functions, the thrust bearing and its bearing must be adapted to support high loads and vibrations.

US-A-2007 144 850 also describes, by way of prior art, such a suspension thrust bearing with only one bearing. The shock absorber piston rod is fixed to the upper race of the bearing, whilst the suspension spring bears axially on a cup that is centred on the lower race of the bearing. This lower race has complex shapes, is bulky and is not a pressing. Such a suspension thrust bearing is not entirely satisfactory, in particular in terms of behaviour in the face of loads and vibrations.

Moreover, for some particular applications it is advantageous to be able to fix the shock absorber piston rod to the lower part of the suspension thrust bearing, on which the suspension spring bears.

The object of the present invention is to propose an improved suspension thrust bearing device.

SUMMARY OF THE INVENTION

To this end, the invention consists in a suspension thrust bearing device adapted to receive a shock absorber piston rod along a main axis, the device including:
 a single bearing forming an axial thrust bearing and including an inner race, an outer race and rolling members disposed between the inner race and the outer race, and
 at least one intermediate member adapted to transmit to the inner race essentially axial forces exerted on the device by a suspension spring.

The suspension thrust bearing device is characterized in that the inner race and/or the intermediate member extend(s) radially beyond the outer race in the direction of the main axis, forming a bearing surface for fixing and centering the shock absorber piston rod relative to the device.

The invention also concerns a motor vehicle McPherson strut including a shock absorber and a suspension thrust bearing device as referred to above.

Accordingly, the suspension thrust bearing device of the invention simultaneously enables rotation of the suspension, reduction of the resisting friction torque of the shock absorber piston rod in the McPherson strut, fixing and centering of the shock absorber piston rod on the bearing surface formed by the inner race and/or by the intermediate member, and withstanding loads and vibrations internal to the McPherson strut. The invention enables production of a device more compact and less costly than existing devices. Some embodiments of the device include more parts than existing devices, but these are then better adapted to their respective function. Moreover, the device of the invention is well adapted to certain particular applications in which fixing the shock absorber piston rod to the body of the vehicle or to the upper race of the bearing of the thrust bearing is impossible or must be avoided.

According to other advantageous features of the invention, taken separately or in combination:

The element forming a fixing and centering bearing surface extends axially at least as far as the outer race along the main axis.

The inner race extends radially beyond the outer race and the intermediate member in the direction of the main axis to form the bearing surface for fixing and centering the shock absorber piston rod relative to the device.

The intermediate member extends radially beyond the inner race and the outer race in the direction of the main axis to form the bearing surface for fixing and centering the shock absorber piston rod relative to the device.

The intermediate member is disposed along the main axis between the inner race and a bearing cup for the suspension spring.

The intermediate member forms a bearing cup for the suspension spring.

The intermediate member is centred on the inner race relative to the main axis.

The device also includes a flange for one-piece retention of the bearing and the intermediate member within the device, the flange notably covering at least in part the outer race and the intermediate member.

The exterior shape of the device is that of a mushroom having a head that includes at least the bearing and a stem that includes at least part of the intermediate member, where the head extends radially beyond the stem whilst the stem extends axially beyond the head relative to the main axis.

The intermediate member includes a body and at least one reinforcing insert covered at least in part by the body.

The bearing employs oblique contact between the rolling members, the inner race and the outer race.

The inner race and/or the outer race form(s) a pressed oblique raceway.

The invention will be better understood on reading the following description given by way of nonlimiting example only and with reference to the appended drawings in which.

DETAILED DESCRIPTION OF THE INVENTION

Figure 1:
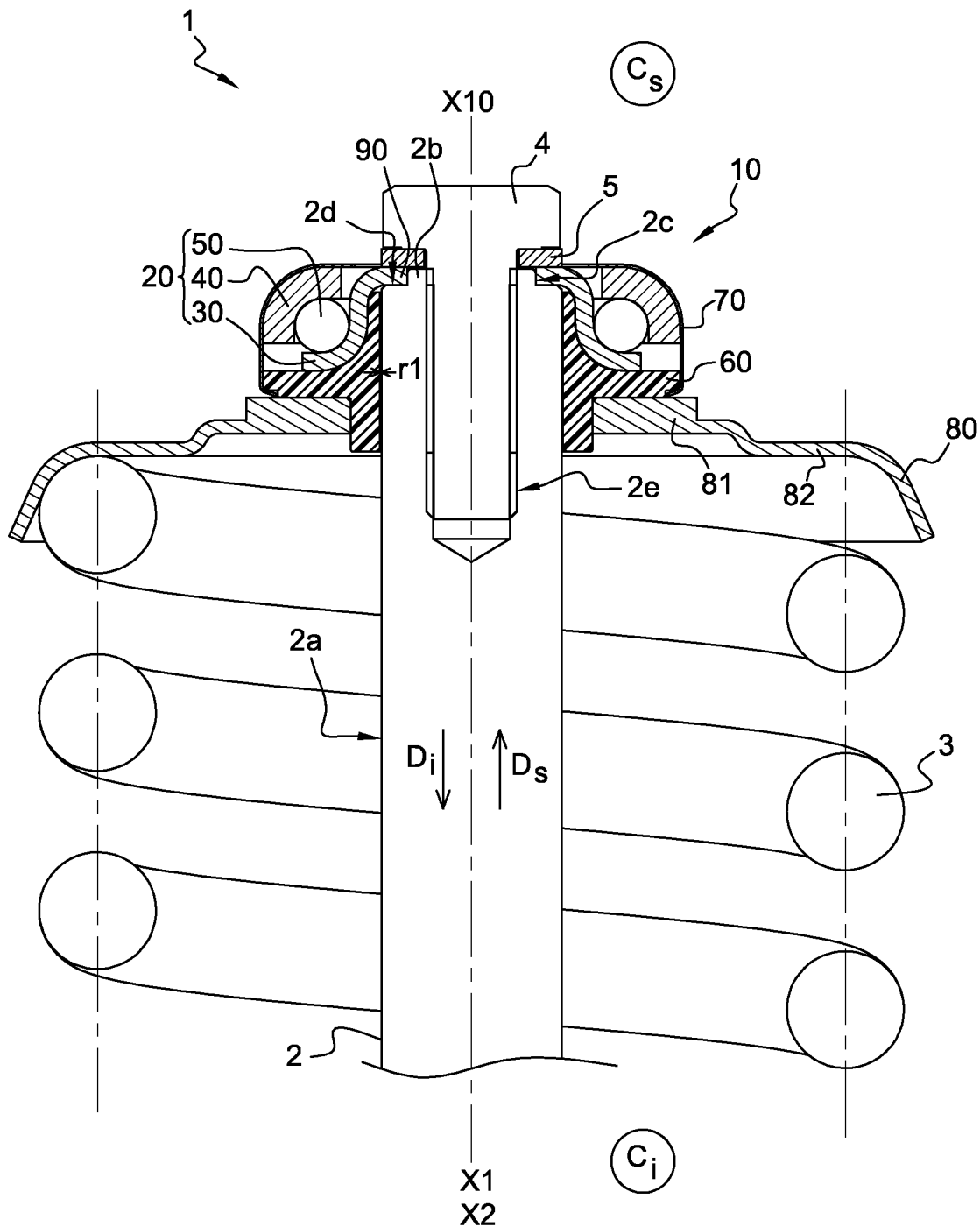
FIG. 1 is a partial axial section of a McPherson strut conforming to the invention including a suspension thrust bearing device also conforming to the invention together with a shock absorber piston rod and a suspension spring.
Figure 2:
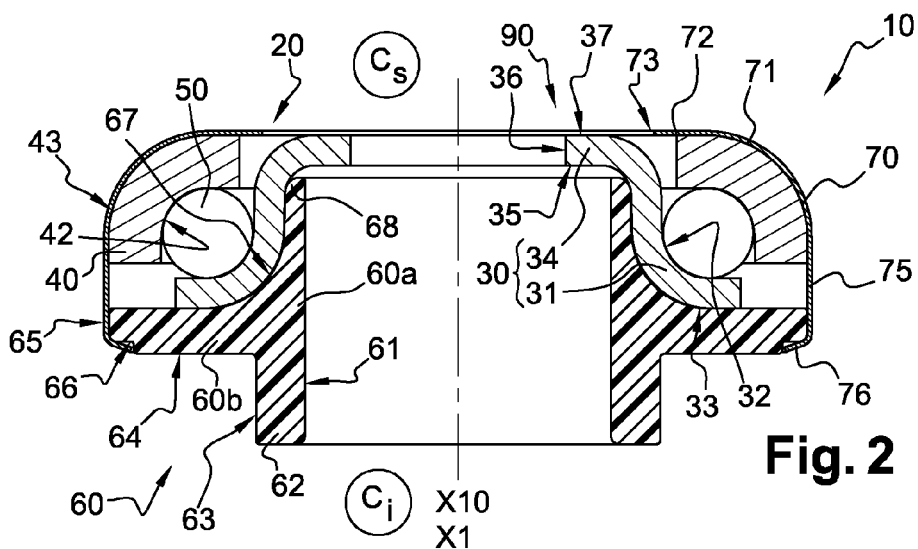
FIG. 2 is a section to a larger scale of the suspension thrust bearing device from FIG. 1.

In FIGS. 1 and 2 there is partially represented a McPherson strut 1 conforming to the invention adapted to equip a motor vehicle suspension system.

The McPherson strut 1 supports a vehicle axle and wheel, not represented for reasons of simplification. The McPherson strut 1 extends along a main axis X1 disposed in a substantially vertical direction when the wheel of the vehicle is resting on flat ground. The McPherson strut 1 includes a shock absorber piston including a piston body and a shock absorber piston rod 2, together with a suspension spring 3, a bolt 4 and a bearing washer 5. The McPherson strut 1 further includes a suspension thrust bearing device 10, also conforming to the invention. The piston rod 2 and the spring 3 are partially represented in FIG. 1 whereas the piston body is not represented for reasons of simplification.

There is defined hereinafter a lower side Ci on which the ground and the wheel of the vehicle are situated and an upper side Cs opposite the lower side Ci, the ground and the wheel. Also defined are a radial direction and an axial direction relative to the main axis X1. Also defined are a lower axial direction Di directed from the lower side Ci parallel to the main axis X1 and an upper axial direction Ds directed from the upper side Cs parallel to the main axis X1.

The shock absorber piston rod 2 extends along an axis X2 and slides in the body, not shown, of the shock absorber piston. When the suspension system of the vehicle is at rest, the axis X2 of the piston rod 2 coincides with the main axis X1 of the McPherson strut 1, as in FIG. 1. The piston rod 2 has a cylindrical exterior surface 2a centred on the axis X2 and an upper end 2b. The end 2b includes a shoulder including a cylindrical radial centering surface 2c and a plane annular axial bearing surface 2d. The surface 2c is parallel to the axis X2 and has a diameter less than that of the surface 2a. The surface 2d is perpendicular to the axis X2 and connects the two surfaces 2a and 2c. The end 2b of the piston rod 2 bears an internal screwthread 2e along the axis X2. This internal screwthread 2e is provided to receive the bolt 4 fitted with the washer 5 so as to assemble the piston rod 2 and the device 10 as described in detail hereinafter.

The suspension spring 3 is disposed between and bears on, on the one hand, the body of the shock absorber piston on the lower side Ci and, on the other hand, a cup 80 equipping the suspension thrust bearing device 10 on the upper side Cs. The spring 3 is wound around the piston rod 2 and the axis X1. The spring 3 is elastically deformable as a function of the loads exerted on the suspension system of the vehicle. The spring 3 exerts axial forces in the direction Ds against the cup 80, which transmits these forces to the thrust bearing 10.

The suspension thrust bearing device 10 includes a single oblique contact bearing 20, an intermediate member 60 disposed between the bearing 20 and the cup 80 on which the spring 3 bears, and a flange 70 for one-piece retention of the bearing 20 and the intermediate member 70. The device 10 and its components 20, 60 and 70 have the general shape of a body of revolution about a central axis X10. When the suspension system of the vehicle is at rest, the axis X10 coincides with the axes X1 and X2, as in the FIG. 1 example.

The bearing 20 includes an inner race 30, an outer race 40 and oblique contact rolling members 50 disposed between the inner race 30 and the outer race 40. The inner race 30 is radially nearer the axis X10 than the outer race 40. The inner race 30 is situated on the lower side Ci, whereas the outer race 40 is situated on the upper side Cs. The races 30 and 40 are preferably metal pressings. In this case, each of the races 30 and 40 forms a pressed raceway for the oblique contact members 50 in the bearing 20.

In practice, the bearing 20 forms an axial thrust bearing within the device 10, and thus within the McPherson strut 1. The bearing 20 enables, on the one hand, relative pivoting between the races 30 and 40 about the axis X10 and, on the other hand, inclination of the axis X2 of the piston rod 2 relative to the body of the vehicle. The bearing 20 is preferably of the oblique contact type in order to limit forces and friction in the device 10 in service. In the example shown in FIGS. 1 and 2, the oblique contact is directed along an axis inclined at 45° relative to the axis X10.

The inner race 30 includes a rolling part 31 and a bearing surface part 34, curved in opposite directions so that the race 30 forms an S-shape. The part 31 includes a concave interior surface 32 forming a raceway for the members 50 and a convex exterior surface 33 forming a bearing surface for the member 60. The part 34 extends from the part 31, being curved, on the upper side Cs, in the direction of the axis X10. The part 34 includes a plane lower annular surface 35 and a plane upper annular surface 37 connected by a cylindrical surface or bore 36. The function of the bearing surface part 34 is described in detail hereinafter.

The outer race 40 includes a concave interior surface 42 forming a raceway for the members 50 and a convex exterior surface 43 covered by the flange 70. At the level of the surface 43, the device 10 may be rigidly fastened to an upper member to be fixed to the body of the vehicle.

The rolling members 50 are disposed between the raceways formed by the surfaces 32 and 42. The members 50 are preferably retained by a bearing cage, not represented for reasons of simplification. In the example shown in FIGS. 1 and 2, the rolling members 50 are balls. Alternatively, the rolling members 50 can be rollers, for example.

The intermediate member 60 includes an axial part 60a that extends parallel to the axis X10 between a lower end 61 and an upper end 68, together with a radial part 60b that extends radially away from the axis X10 from the part 60a, being rooted between the ends 61 and 68. The part 60a includes a bore 61 together with a cylindrical surface 63 situated on the same side as the end 62. The part 60b includes an annular radial surface 64 and a cylindrical surface 65 between which is provided an annular groove 66. The surface 64 faces toward the end 62 and extends radially relative to the part 60a from the surface 63. On the upper side Cs, the surface 65 is connected to the end 68 by a concave surface 67 the shape of which is adapted to espouse the shape of the convex surface 33 of the race 30. Accordingly, the member 60 can be centred relative to the axis X10 on the race 30, with the surface 67 disposed in axial and radial bearing engagement contact with the surface 33.

In practice, the intermediate member 60 is adapted to transmit to the bearing 20 essentially axial forces exerted on the device 10 by the suspension spring 3. To be more precise, these forces are essentially directed in the direction Ds and are transmitted by the spring 3 to the cup 80, then to the member 60, then to the inner race 30 of the bearing 20. The intermediate member 60 is separate from the bearing 20. The member 60 is preferably made of plastic material. Alternatively, the member 60 can be made of metal, for example aluminium, or synthetic material.

The retaining flange or shield 70 is preferably made of metal, plastically deformable around the device 10. The flange 70 includes a curved part 71 espousing the surface 43 of the race 40, an annular part 72 extending radially from the part 71 in the direction of the axis X10 on the upper side Cs, a circular opening 73 centred on the axis X10 and delimited by the part 72, a tubular part 75 extending in the lower direction Di from the part 71, together with a part 76 extending the part 75 on the lower side Ci. When the device 10 is assembled, the part 75 comes to espouse the surface 65 of the member 64, after which the part 76 is clipped into the groove 66. In practice, the flange 70 enables the bearing 20 and the member 60 to remain rigidly connected in the form of a one-piece assembly in the device 10. The flange 70 covers the outer race 40 and part of the intermediate member 60, namely the surfaces 65 and 67, the groove 66 and the end 68.

Accordingly, the exterior shape of the device 10 is that of a mushroom, having a head and a stem. The head of the mushroom comprises the bearing 20 and the member 60, except for its axial part 60a situated on the same side as the end 62 and the stem of the mushroom comprises the end 62 and the surface 63, together with the portion of the bore 61 situated radially facing the surface 63 on the same side as the end 62. The head extends radially beyond the stem, whilst the stem extends axially beyond the head, relative to the main axis X1.

The cup 80 is centred on the device 10, to be more precise on the stem of the mushroom. To this end, the cup 80 includes an interior part 81 for centering it on the device 10, adapted to be centred on the surface 63, whilst coming to bear axially against the surface 64 in the direction Ds. The cup 80 also includes an exterior part 82 on which the spring 3 bears, which extends radially away from the axis X1 from the interior part 81. The part 82 forms a cup the concave side of which is directed from the lower side Ci and the dimensions of which are adapted to those of the spring 3.

The connection between the piston rod 2 and the device 10 is described in detail hereinafter. Once the device 10 has been assembled, the piston rod 2 is introduced into the bore 61 of the member 60 from the same side as the end 62. The axes X1, X2 and X10 are then substantially coincident. As shown in FIG. 1, an overall radial clearance r1 is provided between the surface 2a of the piston rod 2 and the bore 61 of the member 60. The piston rod 2 slides in the bore 61 until the end 2b of the piston rod 2 comes to bear against the surface 36 of the part 34 of the race 30. The surface 2c is then centred radially relative to the axis X1 with respect to the surface 34, whilst the surface 2d comes to abut axially against the surface 35.

In other words, the part 34 of the inner race 30 extends radially beyond the outer race 40 in the direction of the main axis X1, forming a bearing surface 90 for fixing and centering the shock absorber piston rod 2 relative to the device 10. This configuration of the device 10 is particularly suited to certain suspension systems. Moreover, this configuration enables vibrations to be absorbed as well as axial loads exerted in the direction Ds within the device 10.

Moreover, note that the part 34 forming the bearing surface 90 extends axially at the level of the outer race 40, along the main axis X1, in the upper direction Ds away from the piston rod 2 and the spring 3. In this context, the expression "at the level of the race 40" means radially facing the race 40. This configuration enables the axial part 60a of the member 60 also to extend axially in the direction Ds with its upper end 68 situated at the level of the outer race 40. The exterior surface 2a of the piston rod 2 can thus be positioned radially relative to the axis X1 facing the bore 61, so that this bore 61 forms a complementary bearing area for the piston rod 2, notably in the case of axial relative movement reducing the clearance r1 in a radial direction.

Accordingly, one function of the intermediate member 60, which is preferably made of plastic material, is centering and retaining the device 10 relative to the piston rod 2 at the level of the bearing bore 61, in addition to its function of transmitting axial forces exerted on the device 10 by the spring 2. In comparison with certain existing devices, including a bearing bore that extends axially in the lower direction Di, the position of the fixing and centering bearing surface 90 enables the overall size of the device 10 to be reduced.

Figure 3:
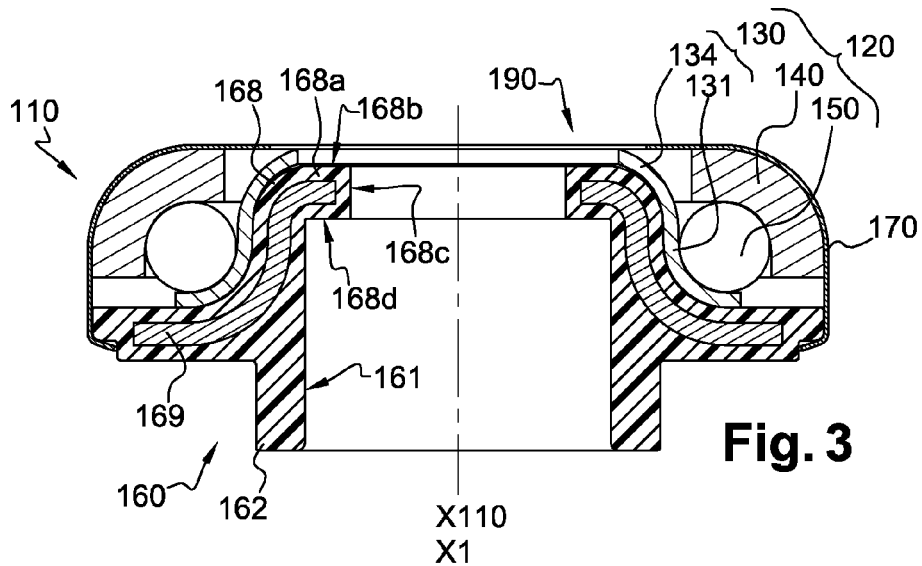
FIG. 3 is a section analogous to FIG. 2 of a suspension thrust bearing device conforming to a second embodiment of the invention.

In FIG. 3 there is represented a second embodiment of a device 110 conforming to the invention.

Certain components of the device 110 are comparable to the components of the device 10 of the first embodiment described above and bear reference numbers increased by 100. This refers to the bearing 120, the inner race 130 including parts 131 and 134, the outer race 140, the rolling members 150, the intermediate member 160 including a bore 161, a lower end 162 and an upper end 168, the flange 170, the axis X110, and the bearing surface 190.

The device 110 has a different structure to the device 10 described above but operates in a similar way. In particular, the device 10 is adapted to receive a shock absorber piston rod 2, a spring 3, a cup 80, a bolt 4 and a washer 5, these components not being represented in FIG. 3 for reasons of simplification.

The principal difference between the device 110 and the device 10 concerns the bearing surface 190, which is not formed by the part 134 of the race 130. The functions of this part 134 include providing a raceway for the members 150 and centering the intermediate member 160 relative to the axis X110. The upper end 168 of the member 160 includes a part 168a that extends radially beyond the outer race 140 and the inner race 130 in the direction of the main axis X1. The part 168a includes a plane annular upper surface 168b, a cylindrical central surface 168c and a plane annular lower surface 168c comparable to the surfaces 37, 36 and 35, respectively, of the device 10 of the first embodiment. Accordingly, the part 168a forms the bearing surface 190 for fixing and centering the shock absorber piston rod 2 relative to the device 110.

Furthermore, a reinforcing insert 169 is optionally integrated into the body of the member 160. The insert 169 is a metal pressing that has the shape of a body of revolution about the axis X10. By way of nonlimiting example, the insert 169 can be integrated into the member 160 by moulding it into it. The insert 169 improves the resistance of the member 160 to the loads exerted by the piston rod 2 and by the spring 3.

Figure 4:
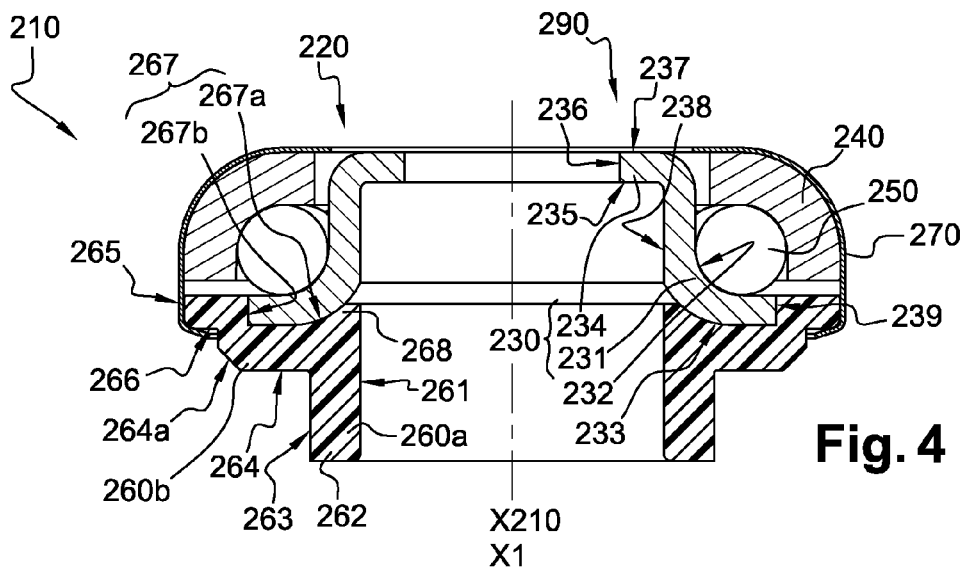
FIG. 4 is a section analogous to FIG. 2 of a suspension thrust bearing device conforming to a third embodiment of the invention.

In FIG. 4 there is represented a third embodiment of a device 210 conforming to the invention.

Certain components of the device 210 are comparable to the components of the device 10 of the first embodiment described above and bear reference numbers increased by 200. This refers to the bearing 220, the inner race 230 including parts 231 and 234, together with surfaces 232, 233, 234, 235, 236 and 237, the outer race 240, the rolling members 250, the intermediate member 260 including an axial part 260a, a radial part 260b, bore 261, a lower end 262 and an upper end 268, a groove 266 and surfaces 263, 264 and 265, the flange 270, the axis X210, and the bearing surface 290.

The device 210 has a different structure to the devices 10 and 110 described above but operates in a similar way. In a manner comparable to the device 10, the centering and fixing bearing surface 290 is formed by the part 234 of the race 230.

The principal difference between the device 210 and the device 10 concerns the arrangement of the race 230 and the intermediate member 260. The race 230 includes a cylindrical interior surface 238 that faces toward the axis X210 between the parts 231 and 234, to be more precise between the surfaces 233 and 235. This surface 238 has a diameter measured with respect to the axis X210 that is substantially equal to that of the bore 261. The end 268 of the axial part 260a of the member 260 extends axially as far as the part 231 and not as far as the part 234. The radial part 260b includes a cavity 267 produced in the material of the member 260, on the upper side Cs in the lower direction Ci, in which the race 230 can be lodged. To be more precise, the cavity 267 has a concave surface 267a that extends away from the axis X210 from the end 268 and is adapted to receive in bearing engagement the surface 233 of the race 230, together with an interior cylindrical surface 267b that faces toward the axis X210 and is adapted to receive in bearing engagement an exterior cylindrical surface 239 at the radial edge of the race 230. The edge surface 239 connects the surfaces 232 and 233. A frustoconical surface 264a connects the surface 264 on the groove 266.

Accordingly, thanks to the presence of the cavity 267, the race 230 can be centred on the member 260 relative to the axis X210 during assembly and retained radially relative to this member 260 in service. The stiffness of the device 210 is improved. Furthermore, the surfaces 238 and 261 conjointly delimit a complementary bearing area for the piston rod 2.

Moreover, the McPherson strut 1 can be conformed differently from FIG. 1 without departing from the scope of the invention. Also, at least certain components of the device 10, 110 or 210 can be conformed differently from FIGS. 1 to 4 without departing from the scope of the invention, for example as a function of the target application. For reasons of simplification, the following description refers to the device 10, it being understood that these explanations are valid for the devices 110 and 210.

In a variant that is not represented the suspension thrust bearing device 10 can equip a suspension system other than that of a motor vehicle.

In another variant that is not represented, the bearing 20 can be of the straight contact type rather than the oblique contact type.

According to a further variant that is not represented, the piston rod 2 may be fixed relative to the device 10 by means other than the bolt 4 disposed in the internal thread 2a of the piston rod 2. For example, the piston rod 2 can include an upper end 2b that is elongate and externally threaded so as to receive a nut.

According to a further variant that is not represented, the intermediate member 60 can be combined with the cup 80. In other words, the member 60 forms a cup 80 for the spring 3 to bear on directly. The member-cup 60-80 is then preferably centred radially with respect to the axis X1 relative to the inner race 30. Alternatively, the member-cup can simply bear axially in the direction Ds against the inner race 30, either directly in contact with it or not.

According to a further variant that is not represented, the flange 70 can be conformed differently from FIGS. 1 and 4. The flange 70 preferably covers at least in part at least the outer race 40 and the intermediate member 60. In one particular embodiment, the flange 70 covers the bearing 20 but not the member 60. In an alternative embodiment, the device 10 need not include the flange 70.

According to a further variant that is not represented, the intermediate member 60 can bear axially against the inner race 30 in the direction Ds without being directly in contact with that race 30. For example, this is the case if the flange 70 covers the bearing 20, extending from the lower side Ci between the race 30 and the member 60.

According to a further variant that is not represented, the device 10 can have a mushroom shape different from that of FIGS. 1 to 4. The mushroom preferably has a head including at least the bearing 20 and a stem including at least part of the member 60, where the head extends radially beyond the stem whilst the stem extends axially beyond the head relative to the main axis X1.

According to a further variant that is not represented, the intermediate member 60 includes a body and at least one reinforcing insert covered at least in part by the body. The body and the reinforcing insert of the member 60 preferably have the overall shape of a body of revolution about the axis X1. In one particular embodiment, the member 60 can include a plurality of reinforcing inserts integrated into the body. In another embodiment, the insert or certain of the inserts are not entirely covered by the body of the member 60.

In any embodiment, the inner race 30 and/or the intermediate member 60 preferably extend(s), on the one hand, radially beyond the outer race 40 in the direction of the main axis X1 and, on the other hand, axially at least as far as the outer race 40 along the main axis X1, in the upper direction Ds away from the piston rod 2 and the spring 3. This element or these elements form(s) a bearing surface 90 for fixing and centering the shock absorber piston rod 2 relative to the suspension thrust bearing device 10. The shock absorber piston rod 2 is not centred on or fixed to the outer race 40 of the bearing 2. Each component of the device 10 has a shape and is made of a material appropriate to its function.

Furthermore, some or all of the technical features of the various embodiments may be combined. Accordingly, the suspension thrust bearing device and the McPherson strut can be adapted in terms of cost and performance to suit different applications.

The invention claimed is:

1. A suspension thrust bearing device adapted to receive a shock absorber piston rod along a main axis, the device comprising:
  a single bearing forming an axial thrust bearing and including an inner race, an outer race and rolling members disposed between the inner race and the outer race, and at least one intermediate member adapted to transmit to the inner race essentially axial forces exerted on the device by a suspension spring, wherein the inner race is substantially S-shaped, and at least one of the inner race and the intermediate member extend(s) radially beyond the outer race in the direction of the main axis, forming a bearing surface for fixing and centering the shock absorber piston rod relative to the device; wherein the inner race extends radially beyond the outer race and the intermediate member in the direction of the main axis to form the bearing surface for fixing and centering the shock absorber piston rod relative to the device.

2. The device according to claim 1, wherein at least one of the inner race and the intermediate member extends axially at least as far as the outer race along the main axis.

3. The device according to claim 1, wherein the intermediate member extends radially beyond the inner race and the outer race in the direction of the main axis to form the bearing surface for fixing and centering the shock absorber piston rod relative to the device.

4. The device according to claim 1, wherein the intermediate member is disposed along the main axis between the inner race and a bearing cup for the suspension spring.

5. The device according to claim 1, wherein the intermediate member forms a bearing cup for the suspension spring.

6. The device according to claim 1, wherein the intermediate member is centering on the inner race relative to the main axis.

7. The device according to claim 1, further comprising a flange for one-piece retention of the bearing and the intermediate member within the device, the flange notably covering at least in part the outer race and the intermediate member.

8. The device according to claim 1, further comprising its exterior shape being that of a mushroom having a head that includes at least the bearing and a stem that includes at least part of the intermediate member, where the head extends radially beyond the stem and the stem extends axially beyond the head relative to the main axis.

9. The device according to claim 1, wherein the intermediate member includes a body and at least one reinforcing insert covered at least in part by the body.

10. The device according to claim 1, wherein the bearing employs oblique contact between the rolling members, the inner race and the outer race.

11. The device according to claim 1, wherein at least one of the inner race and the outer race form(s) a pressed oblique raceway.

12. A motor vehicle McPherson strut including a damper and a suspension thrust bearing device, the thrust bearing device comprising, a single bearing forming an axial thrust bearing and including an inner race, an outer race and rolling members disposed between the inner race and the outer race, and at least one intermediate member adapted to transmit to the inner race essentially axial forces exerted on the device by a suspension spring, wherein the inner race is substantially S-shaped, and at least one of the inner race and the intermediate member extend(s) radially beyond the outer race in the direction of the main axis, forming a bearing surface for fixing and centering the shock absorber piston rod relative to the device; wherein the shock absorber piston rod exerts an axial force on the inner race; wherein the shock absorber piston rod contacts the inner race.

13. The device according to claim 1, wherein the inner race comprises a race surface that is partially concave and partially convex.

14. The device according to claim 13, wherein the race surface comprises an outer surface, wherein a portion of the outer surface is in contact with the rolling members, and wherein the outer surface transitions from convex to concave moving radially away from the main axis.

15. A suspension thrust bearing device adapted to receive a shock absorber piston rod along a main axis, the device comprising:
a single bearing forming an axial thrust bearing and including an inner race, an outer race and rolling members disposed between the inner race and the outer race, and
at least one intermediate member adapted to transmit to the inner race essentially axial forces exerted on the device by a suspension spring, wherein the inner race extends radially inward from the outer race in the direction of the main axis, forming a bearing surface for fixing and centering the shock absorber piston rod relative to the device.

* * * * *